United States Patent [19]
den Hollander et al.

[11] Patent Number: 4,737,691
[45] Date of Patent: Apr. 12, 1988

[54] TELEVISION APPARATUS FOR GENERATING A PHASE MODULATED DEFLECTION CURRENT

[75] Inventors: Willem den Hollander, Schlieren; Giovanni M. Leonardi, Zurich, both of Switzerland

[73] Assignee: RCA Corporation, Princeton, N.J.

[21] Appl. No.: 943,044

[22] Filed: Dec. 18, 1986

[30] Foreign Application Priority Data

Apr. 11, 1986 [GB] United Kingdom ............... 8608876
Apr. 18, 1986 [GB] United Kingdom ............... 8609572

[51] Int. Cl.⁴ ............................................. H01J 29/56
[52] U.S. Cl. .................................... 315/371; 315/387
[58] Field of Search ............... 315/408, 411, 370, 371, 315/387

[56] References Cited

U.S. PATENT DOCUMENTS

| 2,681,383 | 6/1954 | Loe . | |
|---|---|---|---|
| 3,970,896 | 7/1976 | Marina | 315/387 |
| 3,979,640 | 9/1976 | Fischman et al. | 315/387 |
| 3,992,648 | 11/1976 | Avery | 315/387 |
| 4,063,133 | 12/1977 | Nero et al. | 315/387 |
| 4,206,388 | 6/1980 | Ishigaki et al. | 315/371 |
| 4,225,809 | 9/1980 | Ogawa et al. | 315/371 |
| 4,242,714 | 12/1980 | Yoshida et al. | 315/371 |
| 4,277,729 | 7/1981 | Rodgers . | |
| 4,292,654 | 9/1981 | Steckler et al. | 315/411 |
| 4,298,829 | 11/1981 | Luz | 315/371 |
| 4,298,830 | 11/1981 | Knight | 315/411 |
| 4,318,036 | 3/1982 | Bart et al. | 315/408 |
| 4,322,664 | 3/1982 | Bart et al. | 315/408 |
| 4,322,750 | 3/1982 | Lord et al. . | |
| 4,323,826 | 4/1982 | Lehman | 315/408 |
| 4,338,549 | 7/1982 | Haferl | 315/408 |
| 4,464,612 | 8/1984 | Tevling | 315/408 |
| 4,510,527 | 4/1985 | den Hollander | 315/371 |
| 4,536,683 | 8/1985 | Sutton | 315/370 |
| 4,536,684 | 8/1985 | Babcock | 315/408 |
| 4,544,864 | 10/1985 | Haferl . | |
| 4,572,993 | 2/1986 | Haferl | 315/411 |
| 4,584,503 | 4/1986 | Pan | 315/370 |
| 4,642,530 | 2/1987 | Rodriguez-Cavazos | 315/371 |
| 4,668,897 | 5/1987 | Haferl | 315/371 |

FOREIGN PATENT DOCUMENTS 2211326 3/1972 Fed. Rep. of Germany ...... 315/387

OTHER PUBLICATIONS

U.S. patent application Ser. No. 857,375 entitled Television Display System with Flicker Reduction Processor, filed Apr. 30, 1986, in the names of W. den Hollander and G. M. Leonardi.

Primary Examiner—Theodore M. Blum
Assistant Examiner—David Cain
Attorney, Agent, or Firm—Eugene M. Whitacre; Joseph J. Laks; Sammy S. Henig

[57] ABSTRACT

The field rate of a video input signal is doubled by storing each field in a memory and recovering each stored fields twice so as to repeat each field and thus reduce flicker. To ensure that even fields overlay even fields, odd fields overlay odd fields and that all pairs of even and odd fields are interlaced, a timing unit provides a double field rate read control signal to the memory having a waveform that repeats on a two-field basis and supplies a double field rate vertical control signal to a vertical deflection generator having a waveform that is phase modulated and that repeats on a four-field basis. The vertical deflection generator has a constant retrace time and employs DC coupling, thereby avoiding raster shift which otherwise could occur as a result of the phase modulation.

22 Claims, 6 Drawing Sheets

TELEVISION APPARATUS FOR GENERATING A PHASE MODULATED DEFLECTION CURRENT

This invention relates to television deflections systems and particularly to systems arranged to increase the field rate of displayed images for reducing the visibility of flicker.

The threshold of perception of field flicker in a television display system is a function of the flicker frequency and the brightness of the display. Over the years displays have increased in brightness to the point where flicker is noticeable even in relatively high field rate systems (e.g., the NTSC 60 Hz system) and clearly objectionable in lower field rate systems (e.g., the PAL 50 Hz system). A solution to this problem is to double the field rate of displayed images. In one prior art system, a video input signal is stored in a field memory. Each stored field is recovered or "read" twice from the memory and displayed on a display scanned at double the line rate and double the field rate of the incoming video signal thereby doubling the flicker frequency of displayed images and thus reducing the visibility of flicker.

In a copending U.S. patent application No. 857,375 entitled TELEVISION DISPLAY SYSTEM WITH FLICKER REDUCTION PROCESSOR, in the names of W. den Hollander, et al, herein incorporated by reference, a television display arrangement that provides flicker reduction is described. In the den Hollander arrangement, an interlaced baseband television input signal having a given field rate is provided. A memory has a write cycle for storing a field of the input signal and first and second read cycles for recovering the previously stored field two times during one write cycle to provide a video output signal of double the given field rate. The output signal provides picture information for display on a display device. A timing unit, responsive to the video input signal, supplies a read control signal to the memory means having a pulse waveform that repeats on a two-field basis and supplies a vertical synchronizing signal to the display having a pulse waveform that repeats on a four-field basis. The pulses of the pulse waveform are phase modulated on a field basis with a nominal frequency of double the given field rate. The pulse waveform pattern is selected to provide a displayed image on the display in which even fields overlay even fields, odd fields overlay odd fields and in which even and odd field pairs are interlaced. Each pulse of the vertical synchronizing signal initiates a corresponding vertical retrace scanning interval. The pulses of the pulse waveform cause a corresponding phase modulation of the deflection current. Additionally, they cause the durations of corresponding vertical scanning cycles to vary on a field basis and to repeat on a four field basis.

A conventional vertical deflection circuit may include a sawtooth generator, synchronized to a synchronizing signal having a constant phase that generates a drive signal having a sawtooth waveform. In the generator, a capacitor is discharged, during retrace, by a switch and charged, during trace, by a current source. The drive signal is coupled to a switching circuit that produces a deflection current having a corresponding sawtooth waveform. The drive signal includes a ramping portion that corresponds with vertical trace such that the beginning time of the ramping portion corresponds with a deflection current that causes scanning at the top of the raster of the display.

Because of the phase modulation of the pulse waveform of the vertical synchronizing signal that is required in, for example, the den Hollander arrangement, the peak amplitude of the drive signal at the end of vertical trace may also change on a field basis in accordance with the pulse waveform pattern.

Different peak amplitudes of the drive signal may cause the beginning time of the ramping portion to be different relative to the corresponding pulse of the vertical synchronizing signal that causes such ramping portion. This is so because the discharge time of the capacitor of the sawtooth generator may vary in accordance with the peak amplitude of the drive signal that may be different in different fields. The result is that the phase of the trace portion of the deflection current may, disadvantageously, vary from that established by the phase modulated vertical synchronizing signal. Consequently, the requirement that even field should overlap even field, odd field should overlay odd fields and even and odd field pairs should interlace, disadvantageously, may not be fulfilled.

It, therefore, may be desirable in each deflection cycle, to prevent, for example, the beginning time of the ramping portion of the drive signal from being substantially affected by variations in an amplitude, such as the peak amplitude, of the drive signal.

In accordance with an aspect of the invention, a television deflection apparatus that is responsive to a synchronizing input signal at a frequency that is related to a deflection frequency, generates a control signal at a frequency that is related to the frequency of the input signal and at a phase that is modulated. A sawtooth generator responsive to the control signal generates a second signal of sawtooth waveform that is synchronized by the control signal. The second signal has, in a given deflection cycle, a ramping first portion that changes in a first direction and a ramping second portion that changes in the opposite direction such that, in each deflection cycle, when the second signal begins ramping in the first direction, at a beginning time of the first portion of the second signal, the second signal is at a predetermined level that is unaffected by the modulation of the phase of the control signal. A deflection current that has, in accordance with the second signal, a sawtooth waveform is coupled to a deflection winding. The deflection current has a trace portion during a trace interval that corresponds with the first portion of the second signal. The trace portion of the deflection current is phase modulated in accordance with the control signal. The trace portion is maintained in phase, in each deflection cycle, with the control signal, as the phase of the control signal varies.

FIG. 1 that includes FIGS. 1a and 1b illustrates a vertical scan generator that includes a sawtooth generator embodying an aspect of the invention;

Figure 1A:
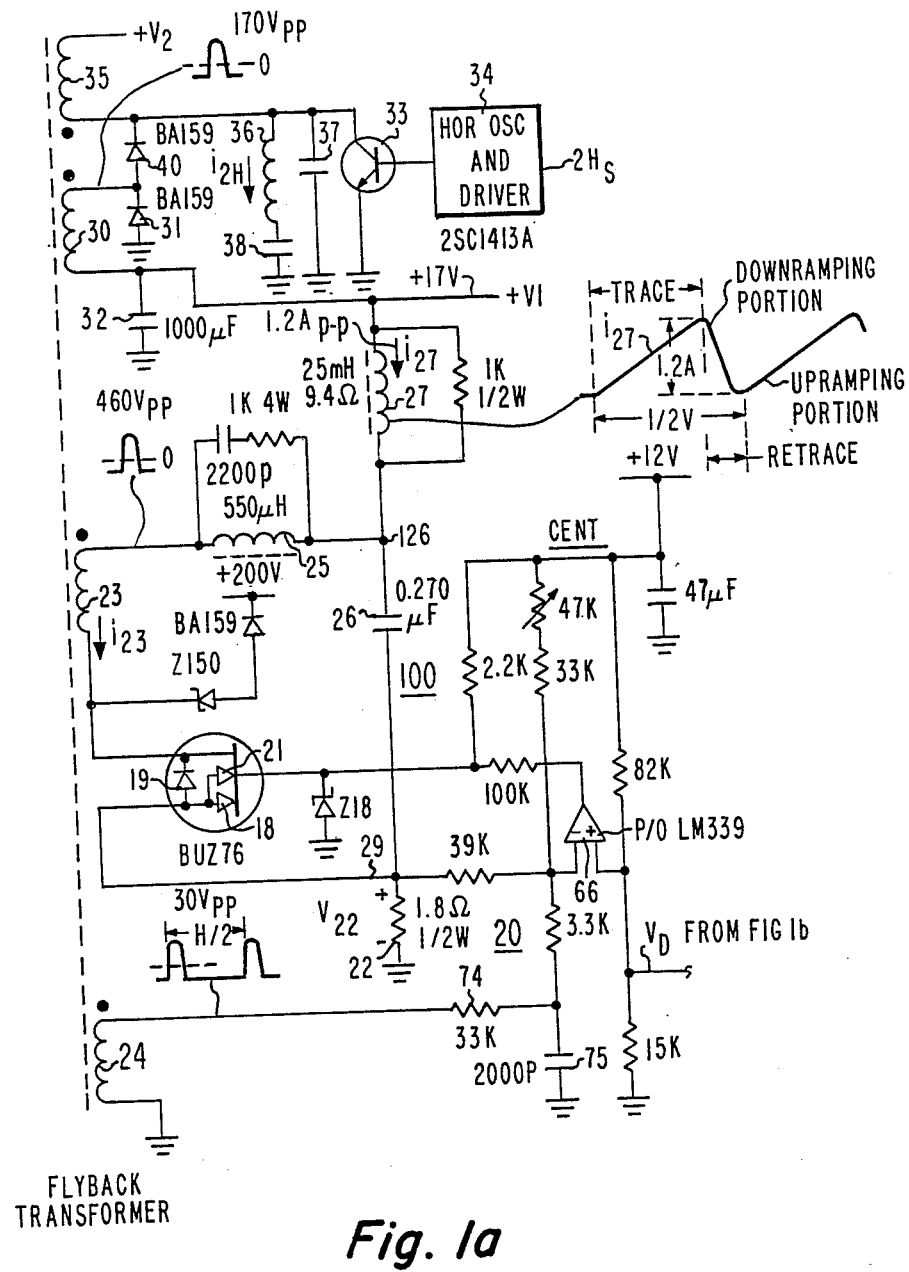
Figure 1B:
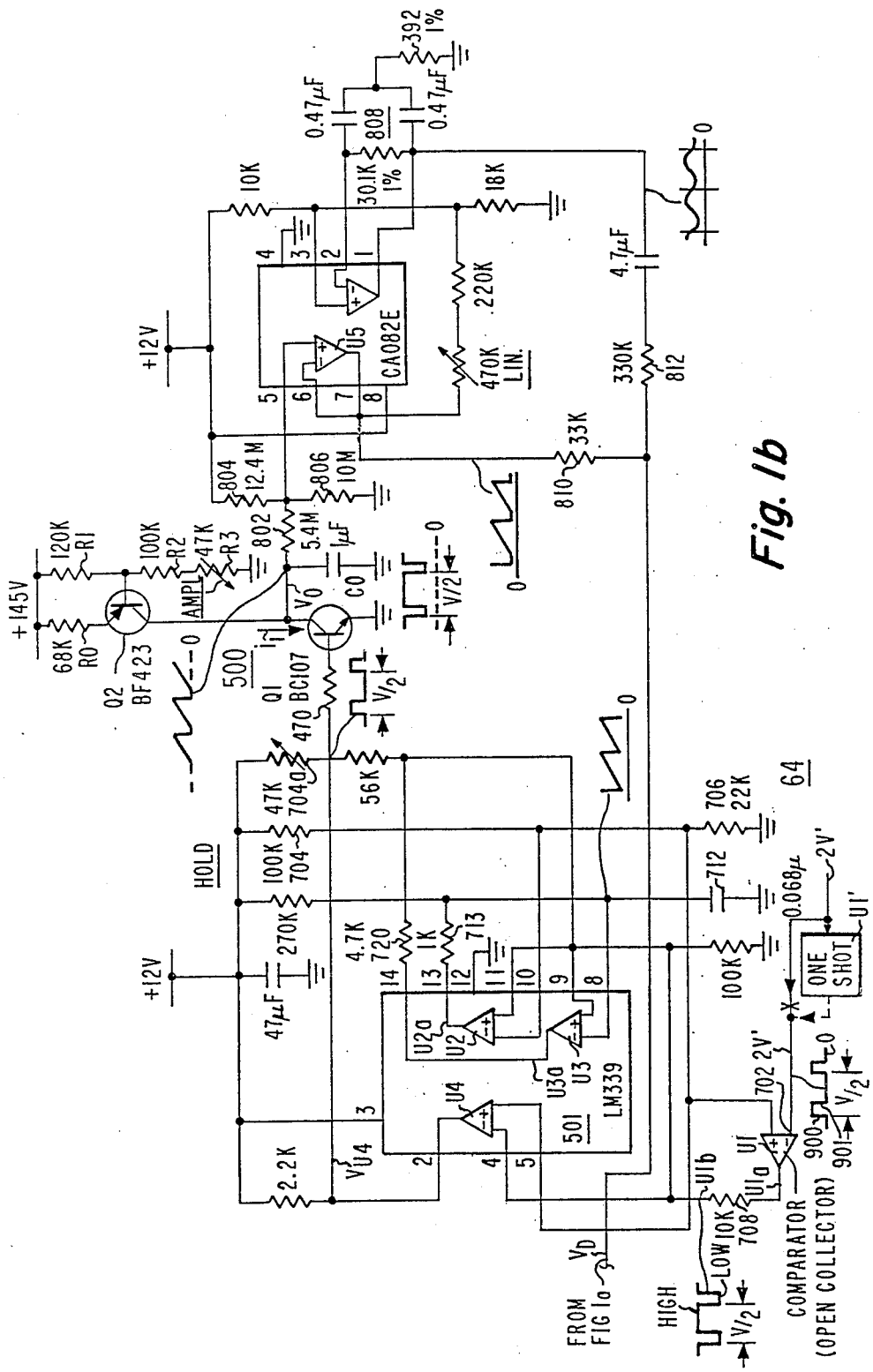

Referring to FIG. 1, a sync pulse 2V' is coupled to a vertical oscillator circuit 501 of a vertical scan generator 64, embodying an aspect of the invention. Sync pulse 2V' is applied to an input terminal 702 of a signal slicer amplifier U1 biased by a voltage that is formed between a resistor 704 and a resistor 706. Pulse 2V' that is phase modulated, is generated in a manner that is described later on. Pulse 2V' has a nominal frequency of $2f_v$ where $f_V$ is the frequency of the vertical sync in a baseband television signal such as of the NTSC or the PAL standard. Pulses 2V' are separated by corresponding intervals of different durations, with the nominal duration being equal to $\frac{1}{2}$V. V represents the vertical scanning interval of 20 milliseconds, in, for example, the PAL standard.

Figure 2:
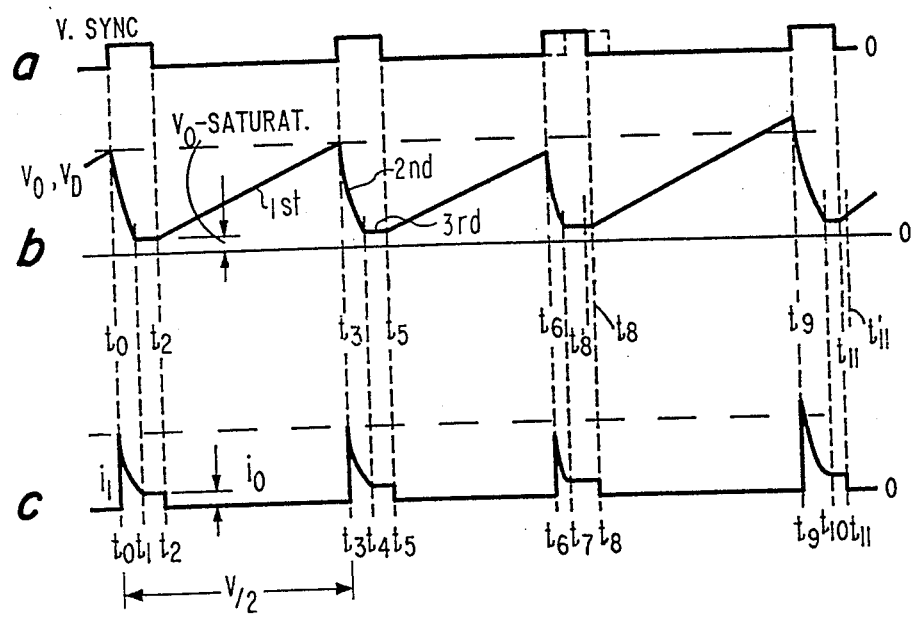
FIGS. 2a–2c illustrate waveforms useful for explaining the operation of the circuit of FIG. 1.

A high-to-low transition of a pulse U1a at an output terminal of amplifier U1 occurs when a leading edge 900 of pulse 2V' occurs. Pulse U1a is coupled via a resistor 708 to form a pulse U1b that is coupled to corresponding noninverting input terminal of an amplifier U2 and of an amplifier U3 and to an inverting input terminal of an amplifier U4. Consequently, amplifier U4 forms pulse $V_{U4}$ at an output terminal of amplifier U4. Pulse $V_{U4}$ has a waveform of the same width as pulse 2V' that is shown during, for example, interval $t_0$–$t_2$ of FIG. 2a. Amplifiers U2 and U3 are coupled in a feedback mode to form the vertical oscillator. As a result of the positive feedback path formed by a resistor 720 of FIG. 1, that is coupled between an output terminal and the noninverting input terminal of amplifier U3, pulse U1b is maintained at a low level that keeps pulse $V_{U4}$ a high level, during, for example, interval $t_0$–$t_2$ of FIG. 2a. Simultaneously, amplifier U2 of FIG. 1 causes a capacitor 712 to discharge rapidly. When the voltage at an inverting input terminal of amplifier U3, that corresponds with the voltage across capacitor 712, becomes lower than the corresponding level of pulse U1b, amplifier U3 ceases conduction and output voltage U3a goes high. Pulse U1b, however, stays low until a trailing edge 901 of pulse 2V' occurs. Conversely, pulse $V_{U4}$ stays high throughout the interval that is between leading edge 900 and trailing edge 901 of pulse 2V'. In the event pulses 2V' are missing, pulses $V_{U4}$ are derived from pulses U3a that are obtained from the output of amplifier U3 and that are applied to amplifier U4 via resistor 720.

Pulse $V_{U4}$ is coupled to control a ramp generator circuit 500, embodying an aspect of the invention that generates a ramp voltage $V_0$ of FIG. 2b. Ramp generator circuit 500 comprises a current source transistor Q2 biased by resistors R0, R1, R2 and R3 to supply current to a current integrating capacitor Co coupled in parallel with the conduction path of a transistor switch Q1. Generator 500 produces an output ramp voltage $V_0$, shown in solid lines in FIG. 2b, that embodies an aspect of the invention. Capacitor Co of FIG. 1 begins discharging when leading edge 900 of pulse 2V' occurs and is discharged to the saturation voltage level of transistor Q1 prior to the trailing edge of each pulse $V_{U4}$, such as prior to time $t_2$ of FIG. 2b. Pulse $V_{U4}$ of FIG. 1 causes transistor Q1 to clamp voltage $V_0$ to the saturation voltage level of transistor Q1, thus preventing voltage $V_0$ from upramping prior to the trailing edge of pulse $V_{U4}$.

The phase modulation of pulses $V_{U4}$, of FIG. 2a that are separated by intervals, having correspondingly different lengths, causes correspondingly different peak values of ramp voltage $V_0$ to occur such as at times $t_0$, $t_3$, $t_6$ and $t_9$, respectively, of FIG. 2b.

An upramping, first portion of voltage $V_0$, occurs during an interval such as interval $t_2$–$t_3$ of FIG. 2b. The first portion begins upramping from a predetermined constant level that is the saturation voltage of transistor Q1 of FIG. 1 in a way that is not affected by phase modulation of pulse 2V'. Thus, the upramping first portion begins upramping at an instant, such as time $t_2$ of FIG. 2b. A downramping second portion of voltage $V_0$ occurs, for example, during interval $t_0$–$t_1$. A flat third portion occurs during interval $t_1$–$t_2$.

In accordance with an aspect of the invention, the sum of the intervals that corresponds with the second and third portions is a predetermined constant that is not affected by the peak value of voltage $V_0$ of FIG. 1. The interval between the beginning of the downramping portion and the beginning time of the upramping portion of voltage $V_0$ such as interval $t_0$–$t_2$ of FIG. 2b may be maintained, illustratively, constant so that it is unaffected by the phase modulation of pulse 2V' of FIG. 1.

It should be understood that pulse 2V' that is generated by timing unit 70 of FIG. 1 may not be wide enough to insure the discharge of capacitor Co to the saturation voltage of transistor Q1. In this case, the pulse that is coupled to inverting input terminal 702 of amplifier U1 may have to be stretched or widened by, for example, a one-shot multivibrator U1' that is coupled in a way shown by the dash line in FIG. 1.

Ramp voltage $V_0$ is DC biased by means of resistors 802, 804 and 806 and buffered by an amplifier U5. The output of amplifier U5 is applied to a linearity correction circuit, indicated generally as 808 which produces a smoothed linearity correction signal that is added to the signal at the output of amplifier U5 by means of resistors 810 and 812 to form a ramp voltage $V_D$ having the same characteristics that were discussed before with respect to ramp voltage $V_0$ and that, additionally, is linearity corrected.

FIG. 1, advantageously, also includes a switched vertical deflection circuit 100 of generator 64 that is controlled by a vertical control circuit 20 of generator 64. The operation of deflection circuit 100 and of control circuit 20 is described in detail in U.S. Pat. No. 4,544,864 in the name of P.E. Haferl, entitled SWITCHED VERTICAL DEFLECTION CIRCUIT WITH BIDIRECTIONAL POWER SUPPLY, that is incorporated by reference herein. Control circuit 20 provides, in accordance with voltage $V_D$, width modulated horizontal, or line rate, switching signals to a switching element 21, illustratively shown as comprising a transistor 18 and an integrated antiparallel diode 19. Transistor 18 may comprise a power field effect transistor which is advantageous when the horizontal rate is higher than the horizontal frequency in, for example, the PAL standard. Such high frequency may be used with computer monitor or video display terminals. Switching element 21 is coupled, via a winding 23 of a flyback transformer 24 that is series coupled to a storage coil 25, to a terminal 126 of a storage capacitor 26. Terminal 126 of capacitor 26 is coupled to a vertical deflection winding 27. The other terminal of vertical deflection winding 27 is coupled to a voltage supply designated +V1. The +V1 supply is generated via a winding 30 of transformer 24, a rectifying diode 31 and a filter capacitor 32. The +V1 supply may also be used to power other receiver circuits.

A horizontal output transistor 33 is switched at the horizontal deflection rate by signals applied to its base from horizontal oscillator and driver circuit 34. The collector of transistor 33 is coupled to a voltage supply designated $+V2$ via a winding 35 of transformer 24. Transistor 33 is also coupled to a horizontal deflection winding 36, an S-shaping capacitor 38, and a resonant retrace capacitor 37. A diode 40 is coupled in series with diode 31 between winding 30 and the collector of transistor 33. The switching operation of transistor 33 generates a horizontal deflection current $i_{2H}$ at twice the horizontal frequency $f_H$ of the sync signal of a baseband video signal $V_{BB}$ that is mentioned later on.

The operation of deflection circuit 100 consists of the horizontal rate charge and discharge of storage capacitor 26 which supplies a vertical deflection current $i_{27}$ that flows in winding 27. Horizontal rate switching is performed by switching element 21.

At the beginning of vertical trace, during each horizontal period transistor 18 of switching element 21 is conductive for a very short interval that occurs immediately prior to horizontal retrace. Consequently, a current $i_{23}$ in winding 23 flows in a direction opposite to that of the arrow that causes capacitor 26 to be charged to a voltage that is more positive than voltage $+V1$. The resulting voltage at terminal 126 that is more positive than voltage $+V1$ causes negative deflection current $i_{27}$ to flow in winding 27, in a direction opposite to that of the arrow. Control circuit 20 progressively increases, during the vertical scanning trace, the conduction interval of transistor 18 that occurs in each horizontal trace. When transistor 18 conducts, capacitor 26 is discharged by an amount that is proportional to the conduction time of transistor 18. The progressive increase in the conduction time of transistor 18 causes the voltage across capacitor 26 to decrease progressively during vertical trace. The voltage across capacitor 26 decreases because more charge is taken away by current $i_{23}$ during the conduction time of transistor 18 that occurs during horizontal trace than added to it during the corresponding horizontal retrace. At the end of vertical trace, the voltage at terminal 126 is less positive than voltage $+V1$ and deflection current $i_{27}$ flows in the direction of the arrow. It follows that from the beginning to the end of vertical trace deflection current $i_{27}$ changes in an upramping manner and reverses polarity at approximately the center of vertical trace.

During vertical retrace, transistor 18 is nonconductive; consequently, deflection winding 27 and capacitor 26 cause a half cycle of oscillation. A resulting vertical retrace voltage charges capacitor 26 to a voltage that is larger than voltage $+V1$ that causes deflection current $i_{27}$ to reverse its polarity.

Voltage $V_D$, embodying an aspect of the invention, is fed to a noninverting input terminal of comparator 66 of FIG. 1. The waveform of voltage $V_D$ may be illustrated as the same waveform $V_0$ of FIG. 2b, neglecting linearity, shaping, DC scale, and DC level shifting. Horizontal retrace pulses, applied via a resistor 74, charge a capacitor 75 to obtain a horizontal ramp which is compared with the vertical sawtooth of voltage $V_D$. Comparator 66 serves as a pulse width modulator. The output of comparator 66 provides base drive to transistor 18.

It can be seen that the current through resistor 22 is equal to the deflection current $i_{27}$. Therefore, the voltage developed across resistor 22 is proportional to current $i_{27}$, the vertical deflection current. The voltage developed across deflection current sampling resistor 22 is produced by deflection current $i_{27}$ and provides negative feedback to vertical control circuit 20. This feedback provides information to vertical control circuit 20 to enable the driving of transistor 18 into conduction for the appropriate duration each horizontal interval to generate vertical deflection current $i_{27}$. Current $i_{27}$, during vertical trace, is linearly proportional to sawtooth ramp voltage $V_D$.

When the leading edge of pulse 2V' or $V_{U4}$, occurs, such as, for example, immediately prior to time $t_0$ of FIG. 2b, the downramping, second portion of voltage $V_D$ begins. The beginning of the downramping portion of voltage $V_D$ causes deflection current $i_{27}$ in winding 27 of FIG. 1 to begins its corresponding downramping retrace portion. When the trailing edge of pulse $V_{U4}$ of FIG. 2a occurs, the upramping trace portion of deflection current $i_{27}$ of FIG. 1 begins.

Voltage $V_D$ controls the instantaneous level of deflection current $i_{27}$ during the vertical trace portion of deflection current $i_{27}$. As described before, in each vertical scanning cycle, voltage $V_D$ is at the same level when the trailing edge of pulse $V_{U4}$ of FIG. 2a occurs.

In accordance with a further aspect of the invention, because of the way voltage $V_D$ is generated, the ramping trace portion in each deflection cycle of both voltage $V_D$ and of deflection current $i_{27}$ of FIG. 1 is in phase with, and follows phase variations of, for example, the corresponding leading edge 900 of pulse 2V'.

As described later on, the phase modulation of pulse 2V' provides the precise timing that is required to provide a displayed image in which proper image registration occurs such that even fields overly even fields, odd fields overlay odd fields and such that even and odd field pairs are interlaced.

It should be understood that as a result of the way the waveform of voltage $V_D$ of FIG. 2b is generated, the interval from the end of vertical trace of a given deflection cycle of deflection current $i_{27}$ of FIG. 1 to the beginning of vertical trace of the following deflection cycle is also constant.

The DC component of the vertical sawtooth of voltage $V_0$ of FIG. 2b should be, preferably, preserved and transmitted to the deflection winding 27 of FIG. 1. DC coupling should preferably be used between the sawtooth generator circuit 500 and vertical deflection circuit 100 as well as to deflection winding 27. DC coupling is preferred so that the phase modulation of pulse 2V' does not change the level of deflection current $i_{27}$ that corresponds with a given level of voltage $V_0$.

Figure 3:
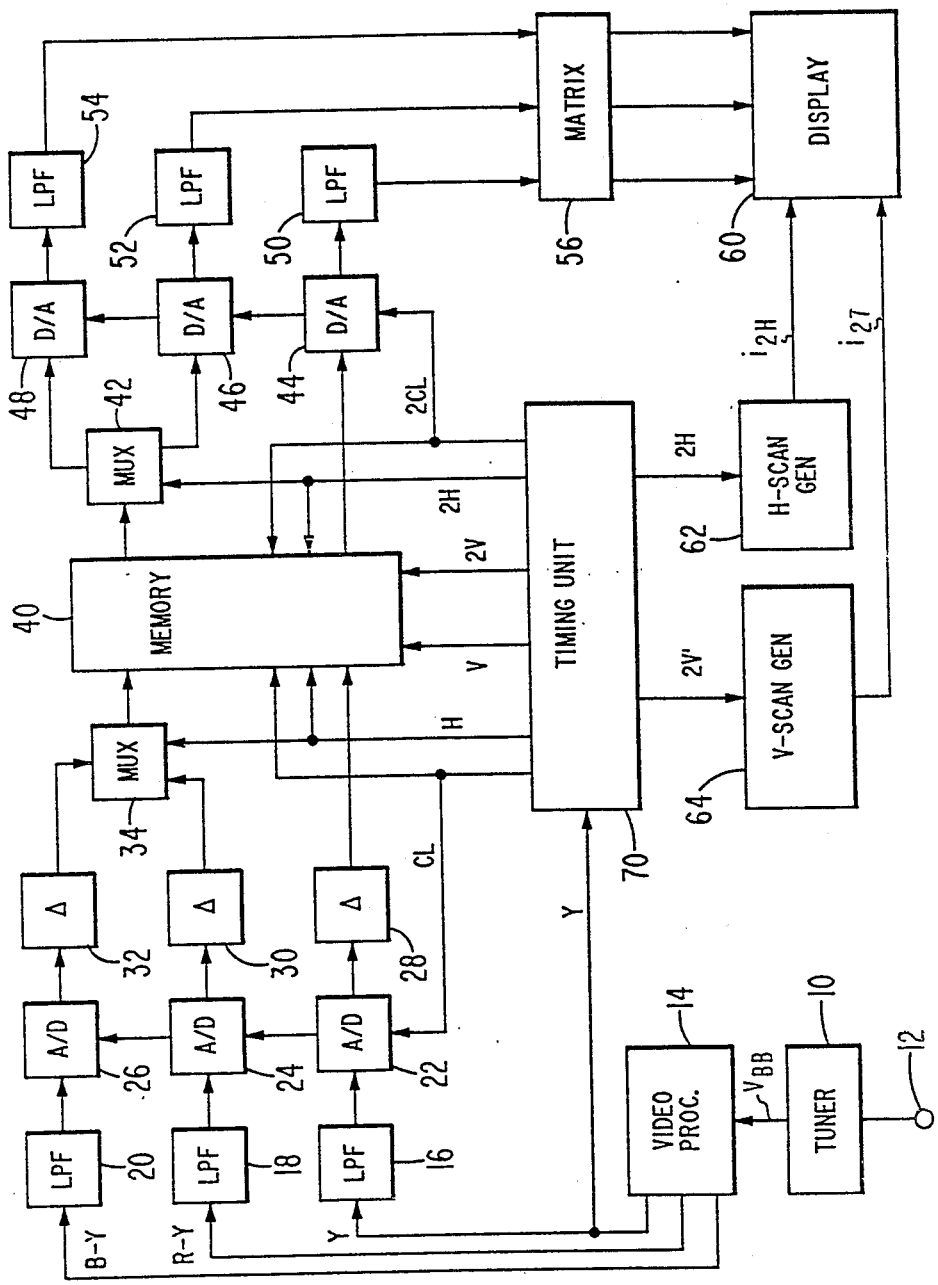
FIG. 3 illustrates a block diagram of a television receiver that includes the generator of FIG. 1.

The above-mentioned features of deflection current $i_{27}$, embodying aspects of the invention, may be useful, for example, in the television receiver circuit of FIG. 3, similar to a circuit that is described in the aforementioned den Hollander application, where the vertical deflection current is phase and amplitude modulated in accordance with a phase modulated vertical sync signal.

The receiver of FIG. 3, that generates pulse 2V' of FIG. 1, includes a tuner 10 of FIG. 3 having an input terminal 12 for connection to an antenna or other source of video input signal and having an output for supplying baseband video output signal $V_{BB}$ that was mentioned before to a video processing unit 14. For purposes of illustration it will be assumed that the baseband video output signal is of the PAL standard. It will be appreciated, however, that the principles of the invention apply also to other standard interlaced video signal formats.

Video processor 14 includes a PAL decoder that converts the input signal to Y, R−Y and B−Y component form. The signal could be processed, if desired, in R, G, B component form but R, G, B components each have full video bandwidth while the color difference signals (R−Y, B−Y) have a lower bandwidth. Accordingly, a field store for color difference signals can be realized with fewer memory elements than would be the case if processing were done using R, G, B components.

The Y, R−Y and B−Y component signal are low pass filtered by filters 16, 18 and 20 and converted to digital form by analog-to-digital (A/D) converters 22, 24 and 26 for storage in a memory 40. Filters 16-20 minimize aliasing and have cutoff frequencies of 7.5 MHz for Y and 2.8 MHz for the color difference signals R−Y and B−Y for the assumed PAL input signal. Lower cut off frequencies would be appropriate for NTSC standard signals.

Converters 22-26 digitize the low pass filtered components to an 8-bit resolution using a sample clock CL that is phase locked to a multiple of horizontal sync in order to obtain a constant number of samples per horizontal line. After A/D conversion the digitized components are applied to memory 40 via respective delay units 28, 30 and 32. The delay units may be variable and are included to equalize the delay times of the three input signal paths. The color difference components R−Y and B−Y are applied to memory 40 via a multiplex switch (MUX) 34 controlled by a horizontal line rate signal H. Switch 34 combines the two 8-bit wide color differences into a single 8-bit wide signal to minimizing storage requirements in memory 40.

As one field of the multiplexed 8-bit signal and the 8-bit luma signal are stored in memory 40, a field previously stored is read out twice using a read clock signal 2 CL of double the write clock CL frequency. This doubles the field rate (100 Hz for PAL, 120 Hz for NTSC) and so reduces the perception of flicker where the signal is displayed on display unit 60. A multiplex switch 42 demultiplexes the color difference signals which, with the double field rate luma signal, are converted back to analog form by digital to analog converters 44-48. Low pass filters 50-54 suppress the repeat spectra after D/A conversion, suitable cut-off frequencies being 13.5 MHz for luma and 6.75 MHz for chroma. The double field rate analog signals are then converted to R G B form for application to display 60 which is synchronized by means of double speed horizontal deflection current $i_{2H}$ and vertical deflection current $i_{27}$ provided by generators 62 and 64, respectively. Generator 62 generates deflection current $i_{2H}$ at twice the frequency $f_H$ of the horizontal sync of baseband video output signal $V_{BB}$.

A field consists of 312.5 lines in the PAL standard. At double speed read out this field together with its repetition must consist of 625 lines. This can be realized when one of the two fields consists of 312 lines and the other consists of 313 lines. Memory 40 of FIG. 3 is supplied with timing signals from unit 70 to provide the field sequence shown in FIG. 4A in which 312 lines are produced in the first read cycle (fields A or B) and 313 lines are produced during the second memory read cycle (field A' or B') with the 313th line being blank.

Figure 4:
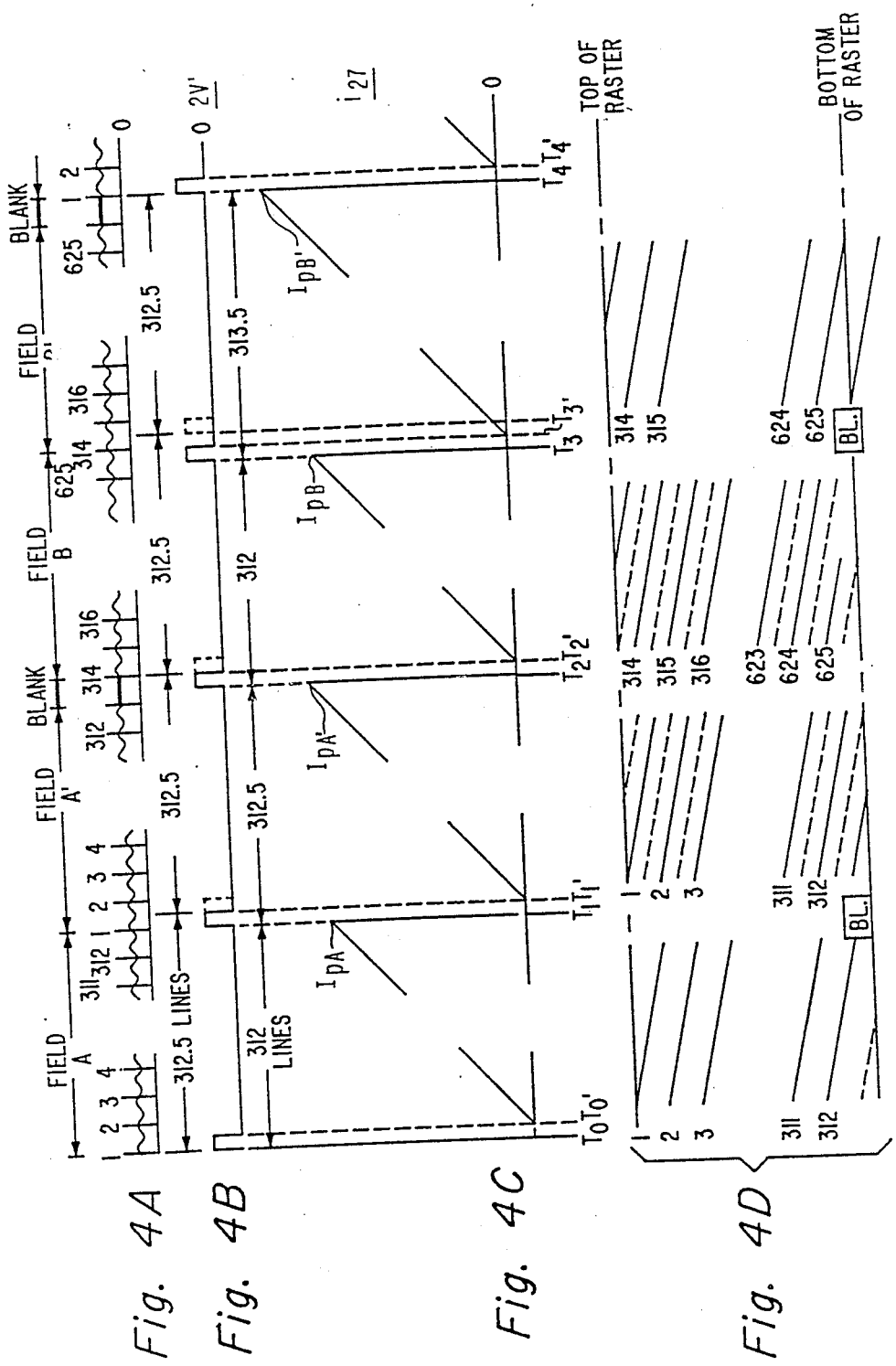
FIGS. 4A–4D are waveform diagrams illustrating the operation of the receiver of FIG. 1.

The double field rate vertical sync pulse 2V' required for generator 64 has the pulse pattern illustrated in solid line in FIG. 4B. For comparison purposes, pulses in dashed-line are provided, which represent a situation of equidistant double rate vertical sync pulses having a period of 312.5 line. The solid line pulses represent pulse signal 2V' of FIGS. 2 and 3, which is periodic on a four-field basis. As shown, there are 312 lines in field A, 312.5 lines in the repeat field A', 312 lines in field B and 313.5 lines in repeat field B'. Pulse 2V' controls vertical deflection generator 100, as described before, to produce the vertical scan waveforms of vertical deflection current $i_{27}$. The vertical trace portions of current $i_{27}$ are shown schematically in FIG. 4C. The scanning current waveform sequence of FIG. 4c results in the interlace pattern shown in FIG. 4D in which the first fields (A, A') overlay first fields, the second fields overlay second field (B, B') and in which the first and second field pairs (AA', BB') are interlaced. For purpose of comparison, the dashed lines in FIG. 4D illustrate scan lines which would result if sync pulses 2V' of FIG. 4B were equidistant rather than being shifted or phase modulated. To ensure proper registration of displayed fields, the sawtooth voltage of FIG. 4C provided by generator circuit 500, that was described before, always starts at the same value and all retrace times (T0-T0', T1-T1', T2-T2', etc.) are equal.

Timing signals for controlling the digital converters, memory, switches and scan generators are provided by timing unit 70 of FIG. 3. Unit 70 generates, as described in den Hollander, two-field and four-field pulse sequences for memory control and for scan generation of pulse 2V' for ensuring that even fields overlay even fields, odd fields overlay odd fields, and that even and odd pairs of fields are interlaced when the double field rate signal is displayed.

The irregularly spaced double field rate vertical sync pulses 2V', absent the operation of ramp generator circuit 500 and of circuit 501 of FIG. 1, embodying aspects of the invention, may, disadvantageously, produce a variation in the phase of the trace portion of deflection current $i_{27}$ relative to the corresponding pulse 2V' over the four field sequence.

Figure 5:
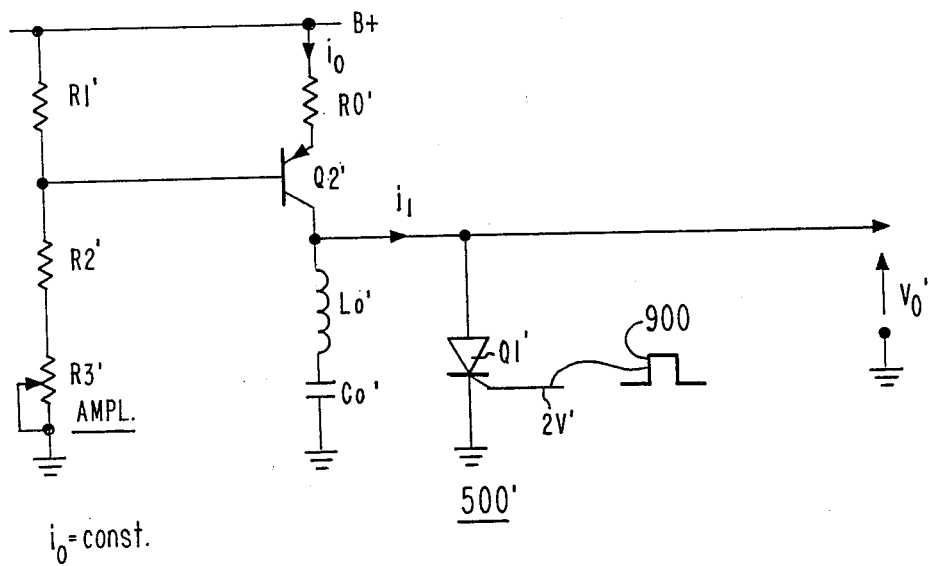
FIG. 5 illustrates an alternative arrangement, embodying another aspect of the invention, to the sawtooth generator of FIG. 1.
Figure 6:
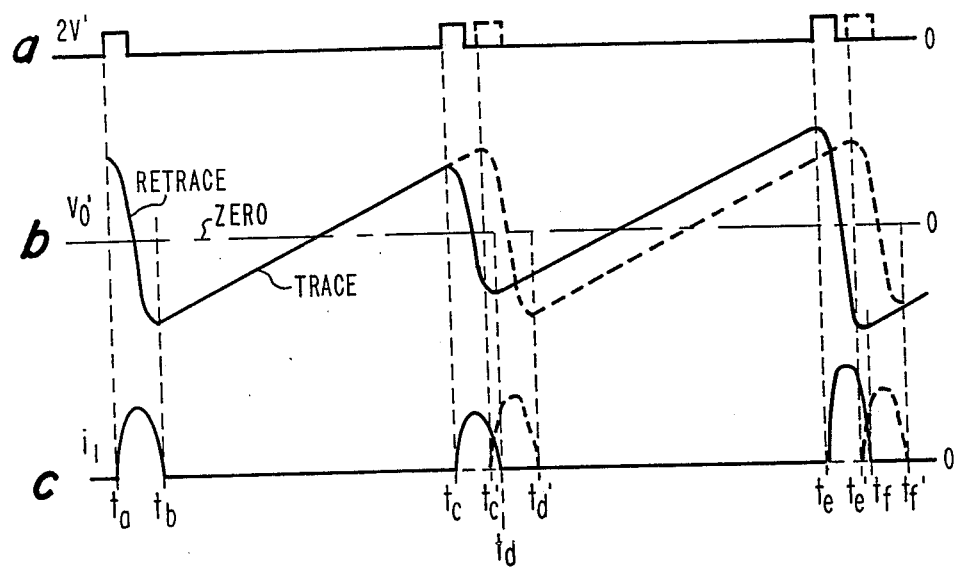
FIGS. 6a–6c illustrate waveforms useful for explaining the operation of the arrangement of FIG. 5.

FIG. 5 illustrates a ramp generator circuit 500', embodying a further aspect of the invention, that performs the analogous function to that of circuit 500 of FIG. 1. FIGS. 6a-6c illustrate the corresponding waveforms associated with circuit 500' of FIG. 5. Similar numbers and symbols indicate similar items and functions in FIGS. 1, 5 and 6a-6c.

In circuit 500' of FIG. 5, a switch $Q_1'$ is used which may be a thyristor as shown; alternatively, it may be a transistor in series with a diode. Switch $Q_1'$ is coupled across a resonant circuit that includes an inductor Lo' and a capacitor Co' in series. The series arrangement of inductor Lo' and capacitor Co' is coupled during vertical trace in the current path of an emitter current, current $i_0$, of a transistor $Q_2'$ that operates as a current source.

When leading edge 900 of pulse 2V' occurs, switch $Q_1'$ becomes conductive to initiate retrace. Switch $Q_1'$, when conductive, couples conductor Lo' and capacitor Co' in parallel. Consequently, a half period of resonant oscillation occurs in inductor Lo' and capacitor Co' that produces the retrace portion of voltage $V_0'$ of FIG. 2b. In the second half period of the oscillation, switch $Q_1'$ is cut-off. The displacement, or phase modulation, of pulse 2V' needed to produce correct raster positioning is only half of the displacement required in the case of FIG. 1. This is because voltage $V_0$ in FIG. 5 is mirrored around the zero-axis, during retrace. For reference purposes, the sawtooth which would result from equidistant sync pulses is shown in dash lines in FIG. 6b.

The retrace interval, such as during interval $t_a - t_b$ of FIG. 6b is not substantially affected by the voltage across capacitor Co' of FIG. 5 at the end of vertical trace; rather, it is determined by the resonance frequency of inductor Lo' and of capacitor Co'.

In accordance with yet another aspect of the invention, as in the case of voltage $V_0$ of FIG. 2b, the phase of the trace portion of voltage $V_0'$ of FIG. 6b relative to that of the corresponding pulse 2V' of FIG. 6a is not substantially affected by the phase modulation of pulses 2V'.

What is claimed:

1. A television deflection apparatus responsive to a synchronizing input signal at a frequency that is related to a deflection frequency, comprising:
    means responsive to said input signal for generating a control signal at a frequency that is related to said frequency of said input signal and at a phase that is modulated;
    a sawtooth generator responsive to said control signal for generating a second signal of sawtooth waveform that is synchronized by said control signal, said second signal having, in a given deflection cycle, a ramping first portion that changes in a first direction and a ramping second portion that changes in the opposite direction;
    a deflection winding;
    means repsonsive to said second signal for generating a deflection current having a sawtooth waveform that is coupled to said deflection winding, said deflection current having a trace portion during a trace interval that corresponds with said first portion of said second signal, that is phase modulated in accordance with said control signal and that is maintained in phase, in each deflection cycle, with said control signal as the phase of said control signal varies.

2. An apparatus according to claim 1 wherein said second signal is at a vertical deflection frequency.

3. An apparatus according to claim 1 wherein said first portion of said second signal causes said trace interval to occur and wherein said second portion causes a retrace interval to occur.

4. An apparatus according to claim 1 wherein said second signal has an amplitude that varies in accordance with the modulation of said phase of said control signal.

5. An apparatus according to claim 4 wherein said predetermined level of said second signal at said beginning time of said first portion is the same in each deflection cycle so as to prevent a variation of said amplitude of said second signal that is caused by the modulation of said phase of said control signal from varying the phase of said trace portion of said deflection current relative to the phase of said control signal.

6. An apparatus according to claim 1 wherein a duration of said second portion varies in accordance with the modulation of said phase of said control signal, and wherein said second signal has a third portion, such that an interval that is equal to the sum of said second and third portions that separates between said first portion of a given deflection cycle and said first portion of the following one has a duration that is the same in each deflection cycle.

7. An apparatus according to claim 6 wherein the length of said interval that is equal to the sum of said second and third portions is unaffected by the modulation of said phase of said control signal.

8. An apparatus according to claim 1 wherein said sawtooth generator comprises a capacitor, a source of current coupled to said capacitor for developing in said capacitor, during said trace interval, said first portion of said second signal that is ramping and a switch coupled to said capacitor and responsive to said control signal for developing in said capacitor said ramping second portion of said second signal.

9. An apparatus according to claim 8 wherein said switch clamps said second signal to said predetermined level throughout an interval that is determined by said control signal.

10. An apparatus according to claim 8 wherein said control signal causes said switch to be conductive throughout an interval having the same length in each deflection cycle.

11. An apparatus according to claim 10 wherein said control signal generating means causes said switch to be conductive until said capacitor is fully discharged to said predetermined level that is at the same value in each deflection cycle.

12. An apparatus according to claim 1 wherein said sawtooth generator comprises a capacitance and an inductance, a source of current coupled to said capacitance to develop, during said trace interval, said first portion of said second signal that is ramping and a switch for coupling said capacitance to said inductance to form a resonant circuit with said inductance, during a retrace interval.

13. An apparatus according to claim 12 wherein said switch comprises a thyristor.

14. An apparatus according to claim 12 wherein said switch coupled said inductance in parallel with said capacitance during said retrace interval.

15. An apparatus according to claim 12 wherein said source of current comprises a transistor having a collector electrode that is coupled to said capacitance such that a current that flows in collector is not substantially affected by said second signal.

16. An apparatus according to claim 1 wherein said control signal is at a nominal frequency that is equal to a vertical rate, and wherein said deflection current generating means comprises a switched vertical deflection circuit that is responsive to a signal at a frequency that is related to a horizontal rate and that generates said deflection current at said vertical rate.

17. An apparatus according to claim 1 wherein said second signal is DC-coupled to said deflection winding.

18. A television deflection apparatus responsive to a synchronizing input signal at a frequency that is related to a deflection frequency, comprising:
    means responsive to said input signal for generating a control signal at a frequency that is related to said frequency of said input signal and at a phase that is modulated;
    a sawtooth generator responsive to said control signal for generating a second signal of sawtooth waveform such that in a given period thereof said second signal includes a first ramping portion that corresponds with a trace interval and a second ramping portion that corresponds with a retrace interval such that an interval that separates an end time of said first ramping portion of a given cycle of said second signal and a beginning time of said first ramping portion of a following one and that includes said second ramping portion has a duration is the same in each cycle and that is unaffected by the modulation of said phase of said control signal;

a deflection winding; and means coupled to said deflection winding and responsive to said second signal for generating in said deflection winding a trace scanning current when said first ramping portion occurs and a retrace scanning current when said second ramping portion occurs.

19. An apparatus according to claim 18 wherein said second signal generating means comprises a capacitance, a source of current coupled to said capacitance for charging said capacitance to develop said first portion of said second signal, a switch coupled to said capacitance for discharging said capacitance to develop said second portion of said second signal.

20. An apparatus according to claim 19 further comprising pulse stretching means responsive to said input signal for generating a pulsed, third signal that is coupled to a control terminal of said switch for controlling a conduction time of said switch such that a width of a given pulse of said third signal is sufficiently longer than a corresponding pulse of said input signal to cause said capacitance to discharge completely during said given pulse of said third signal.

21. A television deflection apparatus responsive to a synchronizing input signal at a frequency that is related to a vertical deflection frequency, comprising:

means responsive to said input signal for generating a control signal at a frequency that is related to said vertical deflection frequency and at a phase that is modulated;

a sawtooth generator responsive to said control signal for generating a second signal of sawtooth waveform that is synchronized by said control signal, said second signal having a vertical trace portion that is phase modulated in accordance with said control signal and that is maintained in phase, in each vertical deflection cycle, with said control signal as the phase of said control signal varies;

a vertical deflection winding;

energy storage means for generating a voltage that is coupled to said vertical deflection winding to provide a vertical deflection current in said vertical deflection winding;

a source of horizontal deflection rate energy; and means responsive to said second signal, and coupled to said energy storage means for applying a predetermined amount of said horizontal deflection rate energy from said horizontal deflection rate energy source to said energy storage means during a first portion of a given horizontal deflection interval and for removing a predetermined amount of energy from said energy storage means during a second portion of said given horizontal deflection interval, said first portion varying relative to said second portion in accordance with said second signal such that said voltage that is generated by said energy storage means varies in a manner to generate said vertical deflection current having a sawtooth waveform that is maintained in phase during each trace interval with said control signal.

22. An apparatus according to claim 1 wherein in each deflection cycle, when said second signal begins ramping in said first direction, at a beginning time of said first portion of said second signal, said second signal is at a predetermined level that is unaffected by the modulation of said phase of said control signal.

* * * * *